March 10, 1925.  
M. C. OVERMAN  
CUSHION TIRE  
Filed Dec. 27, 1921
1,528,888
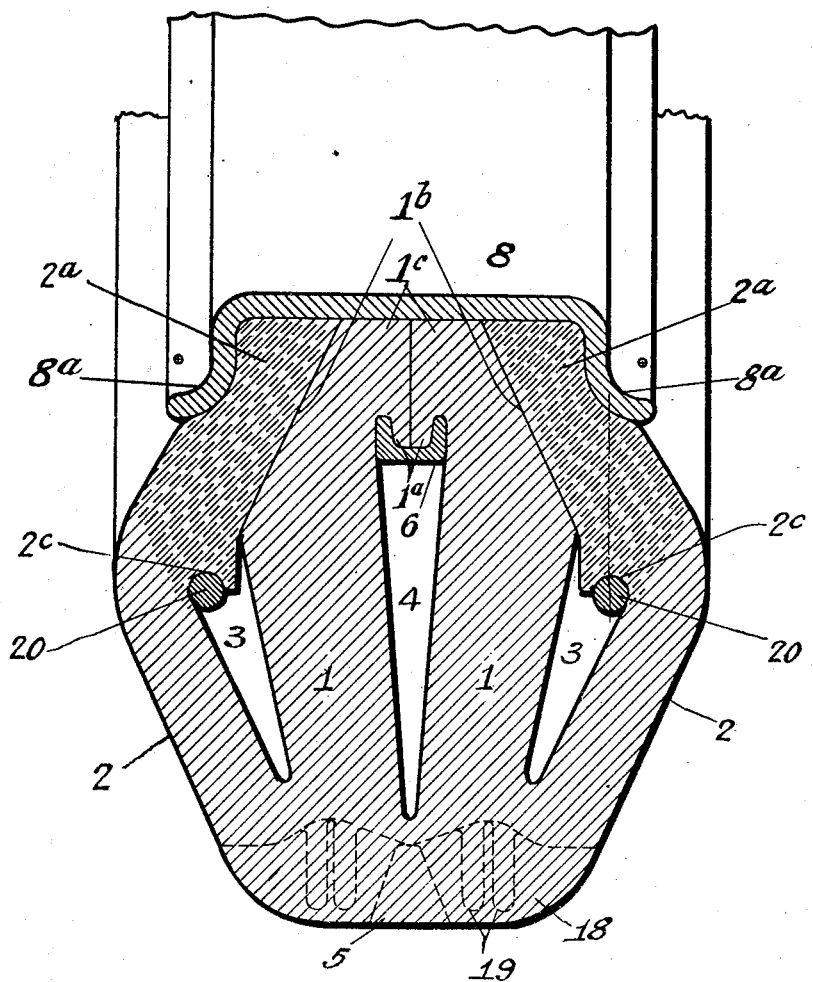
Inventor.  
Max Cyrus Overman  
by Ed. Scherr Jr.  
Attorney Patented Mar. 10, 1925.

1,528,888

UNITED STATES PATENT OFFICE.

MAX CYRUS OVERMAN, OF NEW YORK, N. Y.

CUSHION TIRE.

Application filed December 27, 1921. Serial No. 525,046.

*To all whom it may concern:*

Be it known that I, MAX CYRUS OVERMAN, a citizen of the United States of America, residing at New York, New York, have invented certain new and useful Improvements in Cushion Tires, of which the following is a specification.

My present invention relates to improvements in cushion tires and in its preferred form is specifically an improvement on the tires of my copending applications Serial Nos. 500,367 and 500,368, filed September 13, 1921, comprising the combination with said tires of additional means for securing and stabilizing the outer members of the tire relatively to the rim.

These and other features and advantages of my present improved tire will appear from an understanding of the following description read in connection with the drawings which purport to show only one preferred embodiment of my invention although, of course, other embodiments are possible within the scope of my invention.

In the drawings, Fig 1 is a cross-sectional view through my improved tire and the tire-rim.

Briefly, the tire of my present invention has or may have the following in common with the tire of my aforesaid copending applications. It has upright load-supporting and shock-absorbing inner members 1—1 and laterally stabilizing or bracing outer members 2—2. These members are relatively closely adjacent, separated by proper spaces, two of which 3—3 are similar in cross-section, and a third space being designated 4.

The outer ends of all these members are integrally united by a relatively wide tread-portion 5 having sides which are divergent toward the base of the tire. This provides a tread portion whose outline resembles that of a pneumatic tire in ground contact and like that tire resists penetrating into a soft roadway and adds to its ability to climb out of ruts, etc.

The aforesaid load-supporting and shock-absorbing inner members 1—1 are comparatively tall and thin; and in vertical direction are substantially straight and steeply converge toward the tread, the result of their convergence being that the opening 4 in cross-section is substantially V-shaped, the base thereof being formed by shoulders 1ª—1ª on the base portions 1ᶜ which support said members.

The laterally stabilizing or bracing outer members 2—2 in cross-section are each elbow-shaped, their outer limbs converging toward the tread and their inner or basal limbs toward the rim-engaging portion of the tire. The result is that each of the spaces 3 in cross-section is substantially an obtuse angled triangle with its longest side formed by the side of the adjacent inner member 1.

The respective members 1—1, 2—2 and spaces 3—3 and 4 may be circumferentially continous around the tire. Also the whole tire is preferably molded as an entirety. The material is, of course, rubber or rubber compound or other suitable rubber-like material with or without fabric reinforcings and the like.

I provide a narrow base for this tire to fit a standard pneumatic tire rim and secure it thereto by adaptations and means as follows: The base-portions 1ᶜ for the inner upright members 1—1 are formed with shoulders 1ᵇ—1ᵇ, which may be inclined, and which overlie the complementary base-portions 2ª—2ª for the outer members when all of the member are together with the tire in operative position on the rim. The foregoing coupled with the elbow-shape of the outer members 2—2 provides the narrow base for the tire.

6 is a metal ring which is put into the cavity 4 after the tire has been molded. The inner members 1—1 of the tire are then brought together as in Fig. 1 so that the ring bears upon both of their shoulders 1ª—1ª for securing the tire to the rim, as will be explained later.

8 is or may be a standard pneumatic tire rim having side flanges 8ª—8ª. The flange-space is adapted to receive snugly the above described basal portions of the members 1 and 2 as in Fig. 1, with the outwardly curving flanges supporting the elbow-shaped outer members 2.

This standard flanged rim 8 is or may be circumferentially discontinuous, as explained in my aforesaid earlier applications. This permits the rim to be contracted to apply it to the tire, after which it can be expanded into the position shown with the base of the tire seated in the rim-space.

Any form of expansible rim may be employed; also any suitable means for locking the rim in its expanded condition, for example, that shown in my said co-pending application Serial No. 500,367. For simplicity, no locking means is shown in my present application.

The inside diameter of the ring 6 is sufficiently small so that when the rim is fully expanded, the base-portions of the inner members 1—1 will be securely clamped between said ring and the rim. At the same time, the portions of said inner members that overlie the base-portions of the outer members 2—2 will securely clamp the latter to the rim and the adjacent flanges.

Also, my present tire may be used on other rims including any standard form of detachable rim for pneumatic tires, as explained in my said co-pending applications.

Fig. 1 shows tread openings 18—18 in the tread portion of the tire. These consist of transverse grooves or spaces open at the tread and extending transversely through the sides of the tread portion 5 to and beyond the center of the tread, adjacent spaces extending in overlapping fashion from opposite sides of said tread portion.

19—19 are spaced apart, integral projections from the body of the tread portion located within said grooves 18—18 to act as pebble ejectors.

Referring to Fig. 1, it will be seen that the basal limbs of the outer members 2—2 and their bases $2^a$—$2^a$ are more closely cross-lined or shaded than the remainder of the members. This indicates the portions that are or may be vulcanized to a greater extent so that they have a stiffer, less yielding nature. This causes these portions to act as a firmer support for the outer limbs of the members 2—2, through their greater resistance to bending; also reduces the tendency of these elbowed members to spread outwardly at the elbows; and due to their reduced compressibility causes them to be clamped more certainly against pulling out from under the inner members. In short, the effectiveness of the outer member 2—2 in their laterally stabilizing or bracing function is greatly increased.

Preferably, as in Fig. 1, the greater vulcanization does not extend to or include the elbows of the members 2—2. In consequence these elbows remain relatively soft and yielding, so as not to be broken by side contact with the curb of a side-walk or the like.

Except for the foregoing, I prefer for maximum stiffening and support, to extend the vulcanization well out to the tread-limbs of the members 2—2. This results in the outer limits of the vulcanized portions being preferably inclined as shown in the drawings so as to converge toward the tread without including the outside or curb-contacting portions of the elbow or equivalent lateral buttressing members.

My present improvements are shown in their preferred form in the drawings and consist of a pair of endless rings 20—20 extending around the tire in the openings 3—3, one ring in each opening. These rings bear against and clamp the basal limbs of the elbow-shaped or outer members to the rim 8. For this purpose a concave seat or groove (shown only in cross-section in Fig. 1) is formed at $2^c$ on each of said basal limbs. The rings are preferably made of a stiff material such as metal; but may be made of a non-stretching fabric, cording or rope, etc. The rings are inserted on their seats $2^c$ in the spaces 3 before applying the rim 8 to the tire; and their diameter is such that when the tire is on the rim, the bases $2^a$ and the basal limbs of the members 2 are clamped between the rings and the rim. Thus the rings secure the members 2—2 against being pulled off the rim. They also resist their lateral displacement. Lateral outward displacement of the elbow members tends to occur only in the particular section of the tire that at the given moment is on the road supporting the load. The elbow members of the rest of the tire will not be displaced nor will the rings firmly seated therein be displaced; and consequently said rings, especially if made of a non-pliant material like metal, will resist and prevent any undue outward spreading of the elbow members as they rotate into load-supporting position.

The effectiveness of the rings is increased when they work in combination with the bases $2^a$ and basal limbs that are vulcanized to a greater extent or are otherwise made stiffer and less yielding than the live rubber compound forming the outer limbs or the tread portion of the tire, etc. This is because they have a firmer material to operate against and control; and furthermore are not so likely to work loose.

It is important that the rings be located in vertical alignment with the flanges of the rim. If they were located outside vertical planes through the flanges, instead of clamping the tire members against the rim and giving lateral stability to the tire, they would tend to do the reverse because they would be tending to bend and spread outwardly the tire members.

Since the rings give lateral stability and control to the elbows of the outer members, it follows that said elbows in turn likewise give lateral stability and control to the tread portion of the tire.

It is also to be noted that the lateral distance between the centers of the two rings 20 is less than the distance between the outermost points of contact of the basal limbs $2^a$ with the curved portion of the flanges 8ª, it being noted that the center line shown dotted through the right-hand ring 20 passes through the line of contact between the said basal limb 2ª and the curved flange 8ª on that side, thereby insuring that any compressive action which the ring 20 exerts on the basal limb 2ª will have the effect of pulling the said limb towards the center of the tire and similarly, that any extraneous force tending to deflect the said basal limb outwardly will be resisted by the resistance of the ring 20 to being stretched.

The expression "straight" in the description and claims definitive of the inner members; and "elbow-shaped" definitive of the outer members; and "ends" definitive of the upper and lower portions of said members, of course, refer to said members when looked at or considered in transverse section as in the drawing. Furthermore, expressions of direction herein, such as "upper" and "lower," etc., refer to a transverse section of the tire positioned as shown in the drawing with its tread downward.

It is possible that changes and modifications may be made in the foregoing which will nevertheless still be within the spirit of the foregoing disclosure and within the meaning and spirit of the annexed claims, and which as such are accordingly intended to be covered hereby.

What I claim is:

1. In a tire, the combination of a horizontally disposed tread-portion, spaced substantially straight load-supporting and shock-absorbing inner members uniting with said tread-portion, elbow-shaped laterally stabilizing outer members containing the inner members between them with one set of their limbs converging toward and uniting with said tread-portion and with their other set of limbs converging toward the base of the tire, all of said members having base-portions adapted to be contained in a flanged tire-rim, the base-portions of the inner members being adapted to be engaged by means for securing them to said rim and further being shaped to overlie the base-portions of the outer members; and securing rings in the spaces between the aforesaid inner and outer members engaging those limbs of the latter that converge toward the base of the tire.

2. In a tire, the combination of a horizontally disposed tread-portion, spaced substantially straight load-supporting and shock-absorbing inner members uniting with said tread-portion, elbow-shaped laterally stabilizing outer members containing the inner members between them with one set of their limbs converging toward and uniting with said tread-portion and with their other set of limbs converging toward the base of the tire; all of said members having base-portions adapted to be contained in a flanged tire-rim, the base-portions of the inner members being adapted to be engaged by means for securing them to said rim; and securing rings in the spaces between the aforesaid inner and outer members engaging those limbs of the latter that converge toward the base of the tire.

3. In a tire, the combination of a horizontally disposed tread-portion, spaced substantially straight load-supporting and shock-absorbing inner members uniting with said tread-portion, elbow-shaped laterally stabilizing outer members containing the inner members between them with one set of their limbs converging toward and uniting with said tread-portion and with their other set of limbs converging toward the base of the tire, all of said members having base-portions adapted to be contained in a flanged tire-rim; and securing rings in the spaces between the aforesaid inner and outer members engaging those limbs of the latter that converge toward the base of the tire.

4. In a tire, the combination of a horizontally disposed tread-portion, spaced substantially straight load-supporting and shock-absorbing inner members uniting with said tread-portion, elbow-shaped laterally stabilizing outer members containing the inner members between them with one set of their limbs converging toward and uniting with said tread-portion and with their other set of limbs converging toward the base of the tire, all of said members having base-portions adapted to be contained in a flanged tire-rim; and securing rings in the spaces between the aforesaid inner and outer members engaging those limbs of the latter that converge toward the base of the tire, the limbs so engaged by the securing rings consisting of firmer, more unyielding material than the tread-limbs of said members.

5. In a tire, the combination of laterally spaced inner and outer members united by a tread portion, the upper portions of said members meeting in the basal portion of the tire adapted to be contained in a flanged tire rim, and rings in the spaces between the aforesaid inner and outer members for clamping to said rim the portions of the tire located between said rings and said rim.

6. In a tire, the combination of laterally spaced inner and outer members united by a tread portion, the upper portions of said members meeting in the basal portion of the tire adapted to be contained in a flanged tire rim; rings in the spaces between the aforesaid inner and outer members for clamping to said rim the portions of the tire located between said rings and said rim; and compression ring means in the space between the inner members for clamping the upper portions of said members between said means and said rim.

7. In a tire, the combination of laterally spaced inner and outer members united by a tread portion, the upper portions of said members meeting in the basal portion of the tire adapted to be contained in a flanged tire rim; rings in the spaces between the aforesaid inner and outer members for clamping to said rim the portions of the tire located between said rings and said rim, said rings vertically considered being located inside the outer limits of said flanges.

8. In a tire, the combination of laterally spaced inner and outer members united by a tread portion, the upper portions of said members meeting in the basal portion of the tire adapted to be contained in a flanged tire rim, and tire clamping rings in the spaces between the aforesaid inner and outer members engaging seats in the outer members.

9. In a tire, the combination of laterally spaced inner and outer members united by a tread portion, the upper portions of said members meeting in the basal portion of the tire adapted to be contained in a flanged tire rim, and rings in the spaces between the aforesaid inner and outer members for clamping to said rim the portions of the tire located between said rings and said rim, said clamped portions of the tire consisting of firmer, more unyielding material than the lower portions of the outer members.

10. In a tire, the combination of laterally spaced inner and outer members united by a tread portion, said outer members being elbow-shaped in cross section with their elbows directed outwardly from the sides of the tire, the upper portions of the members meeting in the basal portion of the tire adapted to be contained in a flanged tire-rim, and rings in the spaces between the aforesaid inner and outer members for clamping to said rim the portions of the tire located between said rings and said rim.

11. In a tire, the combination of laterally spaced inner and outer members united by a tread portion, said outer members being elbow-shaped in cross section with their elbows directed outwardly from the sides of the tire, the upper portions of the members meeting in the basal portion of the tire adapted to be contained in a flanged tire-rim, and rings in the spaces between the aforesaid inner and outer members for clamping to said rim the portions of the tire located between said rings and said rim, said clamped portions of the tire consisting of firmer, more unyielding material than the lower portions of the outer members.

In testimony whereof, I have signed my name to this specification this 23d day of December, 1921.

MAX CYRUS OVERMAN.